Patented May 22, 1951

2,553,648

UNITED STATES PATENT OFFICE 2,553,648

NAPHTHOQUINONE COMPOUNDS

Louis F. Fieser, Cambridge, Mass., and Marlin T. Leffler, Lake Bluff, Ill., assignors to Research Corporation, New York, N. Y., a corporation of New York No Drawing. Application January 8, 1948, Serial No. 1,278

6 Claims. (Cl. 260—396)

This invention relates generally to chemotherapeutic substances and more specifically to quinones, including the corresponding hydroquinones and their esters having an antagonistic action upon organisms which cause malarial infections.

We have found that derivatives of 3-hydroxy-1,4-naphthoquinone, as well as their 3-hydroxy esters, the corresponding hydroquinones and the esters thereof, containing in the 2-position certain groups of hydrocarbon radicals and substituted hydrocarbon radicals, have a remarkable antagonistic action against organisms which cause malarial infections.

This application is a continuation-in-part of our application Ser. No. 655,890 and is particularly directed to derivatives of 3-hydroxy-1,4-naphthoquinone of the general formula

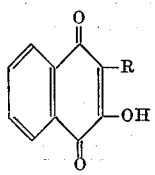

wherein R is an alicyclic ring.

These compounds are highly effective agents for the suppression of trophozoites in ducks, chickens, canaries and monkeys infected with either mosquito- or blood-induced malaria. They are effective prophylactic agents, and are capable, for example, of protecting chickens against infection with malaria following inoculation with sporozoites derived from mosquitoes. They are capable of destroying fully developed exoerythrocytic forms of malaria parasites, as well as the erythrocytic forms, in chickens infected with *Plasmodium gallinaceum*. They function as curative antimalarial drugs, for example, in chickens, ducks and turkeys. They possess an extraordinary power for inhibiting the respiration of parasitized red blood cells and of other respiratory systems, even at extremely high dilution.

The same properties are exhibited by the corresponding hydroquinones, and by esters, for example, the acetates, propionates, caprylates and sulfates, of the hydroxyquinone compounds and of the corresponding hydroquinones.

The following are typical compounds of the invention:

2 - cyclopentyl - 3 - hydroxy - 1,4-naphthoquinone, M. P. 92–94° C.

2 - cyclohexyl - 3 - hydroxy - 1,4 - naphthoquinone, M. P. 136.5–137.5° C.

2 - β - decalyl(cis) -3-hydroxy - 1,4 - naphthoquinone, M. P. 161.5–163° C.

2 - perhydrodiphenyl(cis) - 3 - hydroxy - 1,4-naphthoquinone, M. P. 166–166.5° C.

2 - perhydrodiphenyl(trans) - 3 - hydroxy-1,4-naphthoquinone, M. P. 195.5–196° C.

2 - (p-phenylcyclohexyl($a$)) - 3 - hydroxy - 1,4-naphthoquinone, M. P. 136–137° C.

2 - (p-cyclopentylcyclohexyl(cis)) -3-hydroxy-1,4-naphthoquinone, M. P. 130–139° C.

2 - (p - cyclopentylcyclohexyl(trans)) - 3 - hydroxy-1,4-naphthoquinone, M. P. 179–180.5° C.

The substituted hydroxynaphthoquinones of the invention may be made by the acyl peroxide method described in U. S. Patent No. 2,398,418 of Louis F. Fieser, although occasionally the use of other methods of preparation may be desirable because of the better yields afforded or because of the greater accessibility of the necessary starting materials.

In general, the acyl peroxide method consists in the dropwise addition of an ethereal or hydrocarbon solution of a diacyl peroxide, $(R \cdot CO)_2O_2$, where R represents the organic radical to be introduced into the quinonoid nucleus, to a solution of the hydroxynaphthoquinone in acetic acid at a temperature of about 90° C. The ether distils from the reaction mixture and there results a solution of the substituted quinone, unchanged hydroxynaphthoquinone, the acid $R \cdot COOH$, and hydrocarbons of the types RH and $R \cdot R$. The desired substituted quinone often separates on cooling or after concentration of the acetic acid. In some instances, an ethereal extract of the reaction mixture is advantageously extracted with sodium bicarbonate to remove unchanged hydroxynaphthoquinone, and then with alkali to separate acidic from non-acidic products. It is sometimes expedient to treat the residual acidic fraction with methanol and hydrogen chloride to convert any acid of the type RCOOH into a neutral ester. The substituted product may also be extracted from the unsubstituted material with ligroin.

The alicyclic substitution products of 3-hydroxy - 1,4 - naphthohydroquinone may also be made, usually in better yield, by oxidation by the method of Hooker (J. Am. Chem. Soc. 86, 1168, 1936) of alicyclic-methyl-substitution products which are readily obtainable from the peroxides of the alicyclic-acetic acids by the method of the Fieser patent referred to above.

The 3-cyclohexyl substitution product may also be made by the action of cyclohexene on 1,2,4-trihydroxynaphthalene in the presence of liquid anhydrous hydrogen fluoride and subsequent air oxidation in alkaline solution.

The following are illustrative examples of typical methods of preparing specific compounds of the invention:

2-cyclohexyl-3-hydroxy-1,4-naphthoquinone

A solution of 10.6 grams of hexahydrobenzoyl peroxide in 200 cc. of glacial acetic acid is added to 6.5 grams of 2-hydroxy-1,4-naphthoquinone (lawsone). The mixture is heated with stirring at 100° C. for two hours. At this point the orange to red solution is poured into 500 cc. of ice-water and the whole well extracted with ether. The ether extract is washed carefully with sodium bicarbonate solution to remove unreacted lawsone. Evaporation of the ether leaves a yellow crystalline product which on recrystallization from petroleum naphtha melts at 130° C.

2-(p-cyclopentylcyclohexyl)-3-hydroxy-1,4-naphthoquinone 3.38 grams of a mixture of trans and cis isomers of 2-(p-cyclopentylcyclohexylmethyl)-1,4-naphthoquinone, which can be made from the peroxide of p-cyclopentylcyclohexylacetic acid and lawsone by the method of the previous example, is dissolved in 25 cc. of dioxane and added to 1.2 grams of $Na_2CO_3$ dissolved in 25 cc. of water. The mixture is placed in a water bath held at 70° C. and a stream of nitrogen is passed through the flask over the surface of the liquid. Then 5 cc. of 30% hydrogen peroxide is added and the mixture swirled from time to time. In 20 to 25 minutes the solution becomes colorless. 1-2 cc. of a solution of 10 grams of $CuSO_4$ in 50 cc. of water is added while the solution is warm. The foamy mixture is then cooled to room temperature and the remainder of the $CuSO_4$ solution is added followed by 15 cc. of 25% NaOH. 50 cc. of ethyl alcohol is then added to aid solution of the product and the mixture is allowed to stand at room temperature for about one and a quarter hours. The mixture is then warmed in the steam bath for 15 minutes and filtered through filter-cel to eliminate the copper oxide. The deep-red filtrate is acidified with concentrated hydrochloric acid and allowed to stand over night at room temperature. On filtering and drying 3 grams of product are obtained which can be separated by fractional crystallization from pentane and petroleum naphtha into the trans isomer of 2-(p-cyclopentylcyclohexyl)-3-hydroxy-1,4-naphthoquinone, fine yellow needles, melting at 179-180° C., and the cis isomer, small yellow leaflets, melting at 130-139° C.

3-acyl derivatives of the compounds described above may be made by dissolving the quinone in the appropriate acyl anhydride and warming on a steam bath. At the end of the reaction the reaction mixture is poured into ice water and the product is extracted with ether. The ether solution is separated and dried over anhydrous magnesium sulfate and the product purified in the usual manner by recrystallization from an appropriate solvent.

To form the triacyl derivatives of the corresponding hydroquinones, the quinone is first reduced with zinc in dilute acid to the hydroquinone, which is then treated with acyl anhydride in the manner described above.

This application is a continuation-in-part of our application Serial No. 655,890, filed March 20, 1946.

We claim:

1. Chemical compounds of the formula

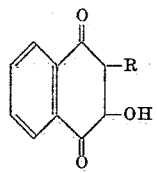

wherein R is selected from cyclopentyl, cyclohexyl, cis-β-decalyl, cis-perhydrodiphenyl, trans-perhydrodiphenyl, p-phenylcyclohexyl, p-cyclopentylcyclohexyl (cis) and p-cyclopentylcyclohexyl (trans).

2. 2 - cyclohexyl - 3 - hydroxy - 1,4 - naphthoquinone.

3. 2 - (cis - p - cyclopentylcyclohexyl) - 3 - hydroxy-1,4-naphthoquinone.

4. 2 - (trans - p - cyclopentylcyclohexyl) - 3 - hydroxy-1,4-naphthoquinone.

5. 2 - β - decalyl(cis) - 3 - hydroxy - 1,4 - naphthoquinone.

6. 2 - perhydrodiphenyl (trans) - 3 - hydroxy-1,4-naphthoquinone.

LOUIS F. FIESER.
MARLIN T. LEFFLER.

REFERENCES CITED

The following references are of record in the file of this patent:

Gates: Journ. Am. Chem. Soc., vol. 64, pp. 1979–1980 (1942).